United States Patent Office 3,502,155
Patented Mar. 24, 1970

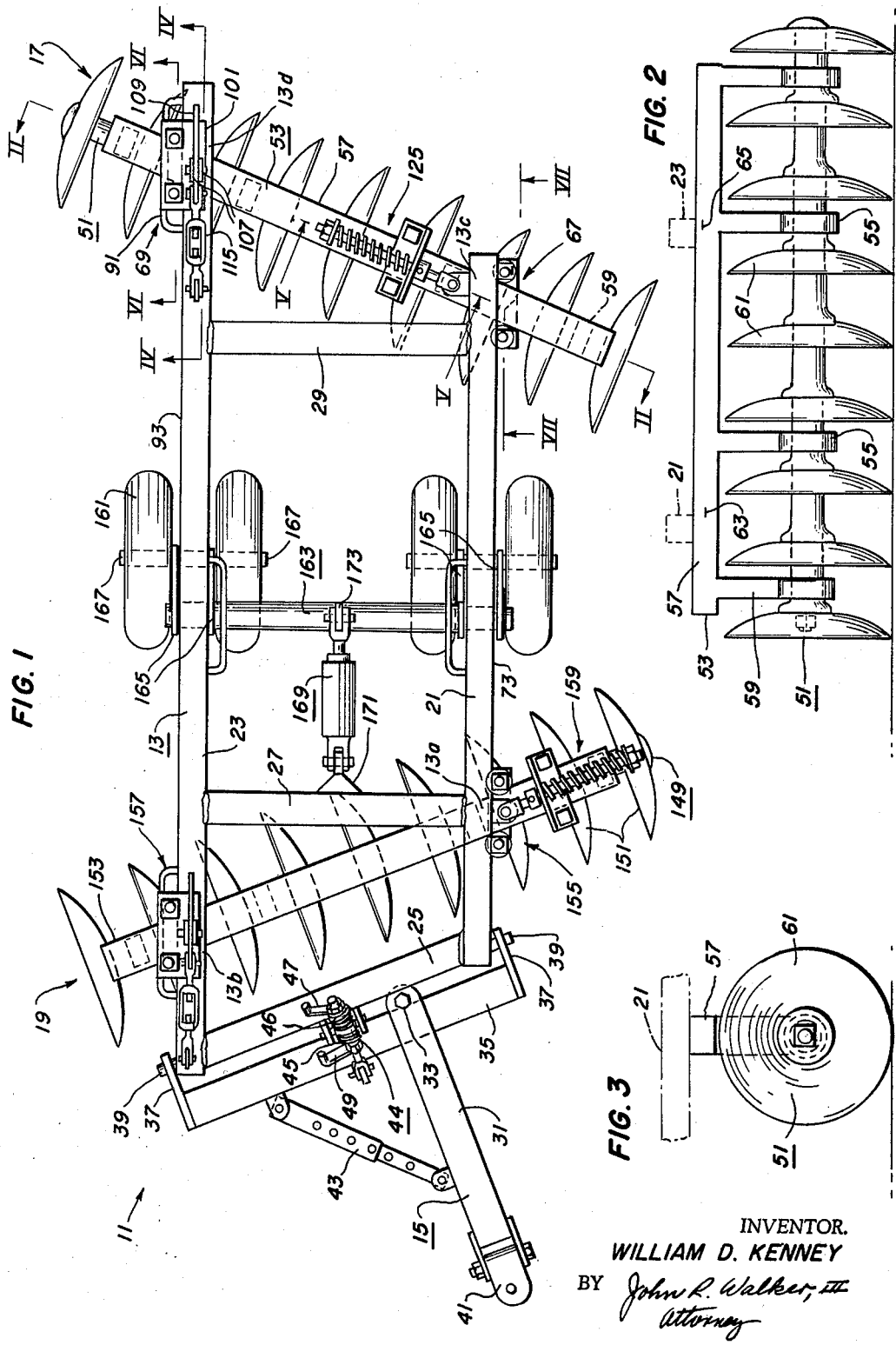

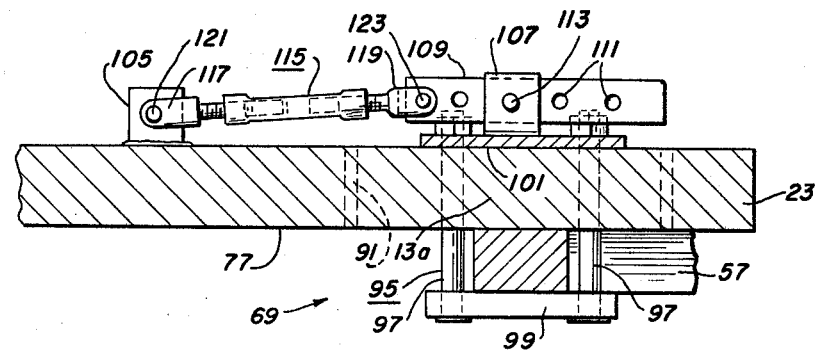
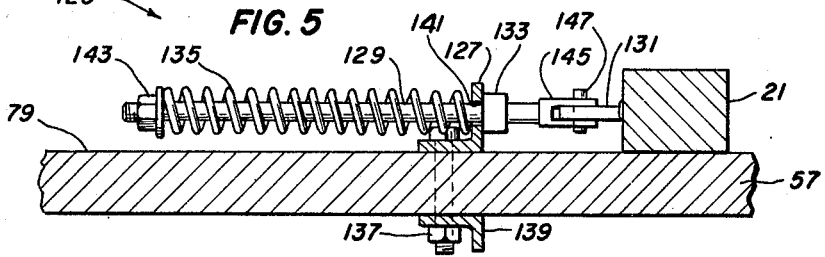
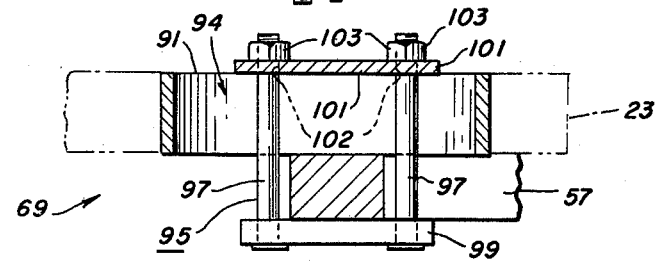
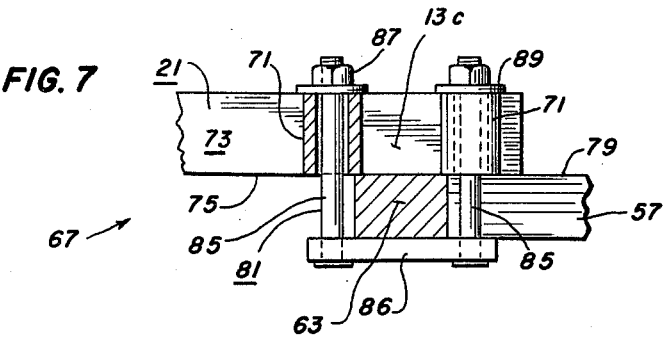

3,502,155
DISC HARROW HAVING AXIALLY RESILIENT DISC BLADES
William D. Kenney, Memphis, Tenn., assignor to Midland Manufacturing Company, Inc., Memphis, Tenn., a corporation of Tennessee
Filed Oct. 3, 1967, Ser. No. 672,507
Int. Cl. A01b *35/28, 63/00*
U.S. Cl. 172—570                                    11 Claims

ABSTRACT OF THE DISCLOSURE

A rigid frame disc harrow pull-type implement having means for resiliently absorbing the axial thrust or side draft on the disc blades of the harrow, and also having means for readily adjusting the pitch angle or angle of attack of the disc blades on the land surface being worked.

BACKGROUND OF THE INVENTION

Field of the invention

It pertains particularly to offset type disc harrows having rigid frame means. The inventive structure may be incorporated in single swath type disc harrows and double swath or so-called tandem type harrows.

Description of the prior art

To my knowledge, there have not been previous disc harrows having means for resiliently absorbing the working lateral axial thrust forces on a disc blade in a disc harrow. With the advent of hydraulic power use in pull-type implements, the rigid frame, liftable, disc harrow has become much in use. Also, rigid frame harrows having extendable retractable pneumatic tired wheels are extensively used and such harrows are readily manipulated and transported. Such rigid frame harrows typically have the disc blades fixedly journaled on the frame of the harrow. In working such a harrow, when a disc blade strikes a stump or rock in the ground surface, blade fatigue or blade breakage often occurs. This is primarily because there is no blade mounting means for absorbing or dampening the shock and the shock forces are transmitted directly to the frame. Since the rigid horizontal frame of a typical liftable or transportable harrow substantially integrally connects the several disc gangs of the harrow, the shock on one blade or one disc gang is carried to all the disc gangs of the harrow. Substantially the whole weight of the harrow thus reacts against the single blade which strikes the rock or stone. This arrangement in many cases resulted in broken disc blades.

SUMMARY OF THE INVENTION

The present invention includes a rigid horizontal main frame and a vertical frame or yoke journaling each disc gang, and includes means for firmly constraining each yoked disc gang from the main frame while permitting relatively free lateral movement of each yoke relative to the frame. By this means, when a blade or a disc gang strikes a solid object, the yoked disc gang may move quickly laterally and bypass the object without too much strain on the disc blade. The invention also includes thrust spring means operatively interposed between the harrow frame and each disc gang for yieldably urging each disc gang against the axial thrust of each blade of the disc gang. And further, the invention includes means for selectively adjustably fixing the lateral angle of each disc gang or the angle of attack of each disc gang relative to the land surface being worked.

BRIEF DESCRIPTION OF THE DRAWING

FIG. 1 is a top plan view of the disc harrow of the present invention.

FIG. 2 is a vertical plane view of the rearward disc assembly taken as on the line II—II of FIG. 1.

FIG. 3 is an end elevational view of the disc assembly of FIG. 2.

FIGS. 4, 5, 6 and 7 are detailed views taken respectively on the lines IV—IV, V—V, VI—VI and VII—VII of FIG. 1.

DESCRIPTION OF THE PREFERRED EMBODIMENT

The invention in its preferred form is incorporated in an offset type harrow 11 including a frame 13, a tongue 15 for attaching the frame to a tractor, rearward and forward disc assemblies 17, 19 and means movably mounting the disc assemblies subjacently on the frame.

Frame 13 is fabricated from straight members arrayed generally horizontally and includes a left rail member 21, a right rail member 23, and first, second and third cross members 25, 27, 29 respectively. The ends of the cross members are butt-joined with the inward side surfaces respectively of left and right rail members 21, 23. The frame members of frame 13 each are square-sectioned and all are preferably the same size cross sectionally. The member 21 is shorter than member 23, and member 25 is disposed at an angle relative to members 21, 23, as best seen in FIG. 1. For purposes of clarity, the forward left and right portions of frame 13 and the rearward left and right portions of the frame are designated frame elements 13a, 13b, 13c and 13d. It will be understood that frame elements 13a and 13c are respectively forward and rearward portions of left rail member 21, and that frame elements 13b and 13d are respectively forward and rearward portions of right rail member 23.

Tongue 15 includes a forwardly projecting tongue body 31 pivotally connected by pin 33 to a bridle bar 35. Upwardly projecting end plates 37 fixed respectively on the opposite end portions of bridle bar 35 pivotally engage oppositely projecting pins 39 fixed on frame 13. Tongue 15 is pivotable about the horizontal axis of oppositely projecting pins 39. An apertured clevis 41 pivotally secured on the distal forward end of tongue body 31 is adapted to detachably engage the draw pin of a tractor. Extendable bar means 43 diagonally fitted between tongue body 31 and bridle bar 35 selectively adjusts the swath or track of harrow 11 relative to the track of the towing vehicle. Vertically double-acting leveler means 44 is operatively interposed between first cross member 25 and tongue bridle bar 35. Leveler means 44 is somewhat typical and includes springs 45, 46, upper and lower lever nuts 47, 49 for flexibly bidirectionally adjusting the angle between frame 13 and tongue 15. Turnably manipulating lever nuts 47, 49 selectively pivotally urges tongue 15 upwardly or downwardly about pivot pins 39 and by reactive action levels frame 13.

Rearward disc assembly 17 includes a disc gang 51, a yoke 53 and bearing means 55 journaling disc gang 51 on yoke 53 (see FIGS. 1 and 2). Yoke 53 provides the frame means for disc assembly 17 and includes a crossbar 57 and a plurality of laterally aligned downwardly projecting strut bars 59. The strut bars extend between adjacent pairs of disc blades 61 and house bearing means 55 at the distal downward end portions thereof. Crossbar 57 preferably is rectangular in section and includes left and right crossbar portions 63, 65 respectively (see FIG. 2).

Rearward left and right shackle means 67, 69 movably mount disc assembly 17 under the rearward portion of frame 13. Left shackle means 67 includes a pair of U-sectioned channel members 71 arranged parallel and fixedly secured vertically on outside surface 73 of left frame rail 21 (see FIG. 7). U-sectioned channel members 71 each are secured along the distal ends of the legs of the U-sectioned channel members to side surface 73 of frame rail 21 and define a pair of parallel vertical passages. The undersurfaces 75, 77 respectively of left and right frame rails 21, 23 restingly engage the top surface 79 of forward disc assembly crossbar 57. A U-bolt 81 transversely straddles crossbar portion 63 and is arranged laterally adjacent left rearward frame element 13c of frame rail 21. U-bolt 81 is arranged vertically with parallel shank portions 85 projecting upwardly through channel members 71 and with horizontal bight plate 86 thereof engaging the undersurface of crossbar portion 63. Nut means including nuts 87 and washers 89 are fitted on the upper distal ends of U-bolt shanks 85 and loosely clamp drawbar 57 and frame rail 21. Nuts 87 preferably are the self-locking type and are drawn up loosely and in such a manner as to permit free lateral sliding movement of crossbar 57 relative to frame 13.

Rearward right shackle means 69 includes a rail-like guide bracket 91 secured longitudinally on outside surface 93 of right frame rail 23 (see FIGS. 1 and 6), and is arranged laterally adjacent right rearward frame element 13d. Guide bracket 91 is formed of strap material and the opposite end portions are correspondingly bent parallel. The opposite end edges of guide bracket 91 are abuttingly secured on right frame rail surface 93 and the guide bracket defines a longitudinally extending vertical slotted opening 94 (see FIG. 6). A U-bolt 95 having parallel shank portions 97 and a bight portion 99 projects upwardly through slotted opening 94. A flat horizontal plate 101 having a pair of apertures 102 is provided. U-bolt 95 transversely straddles crossbar 57 with parallel shanks 97 extending through apertures 102 in plate 101. Self-locking nuts 103 threaded on U-bolt shanks 97 loosely engage plate 101. Crossbar 57 and frame rail 23 are loosely vertically clamped in such a manner as to permit free axial movement of crossbar 57 and also free fore and aft movement of the crossbar relative to frame rail 23.

Means is provided for fore and aft adjustably positioning plate 101 relative to right frame rail 23 and includes both removable pin adjustment means and turnbuckle adjustment means (see FIG. 4): An apertured anchor tab 105 is fixed on and projects upwardly from right rail 23. A parallel pair of anchor tabs 107 are fixed on and project from the upper surface of plate 101. A flat bar 109 having a series of spaced apertures 111 is fitted between anchor tabs 107. A pin 113 extending through aligned apertures in tabs 107 is selectively insertable in a desired one of bar apertures 111. A turnbuckle 115 having opposite end clevises 117, 119 adjustably couples anchor tab 105 and bar 109. Clevise pins 121, 123 extending respectively through tab 105 and bar 109 particulatingly connect turnbuckle 115 respectively with tab 105 and bar 109.

Fine and coarse adjustment means are provided respectively by the turnbuckle and removable pin adjustment means of the harrow: A fine adjustment may be had by turnably manipulating turnbuckle 115 or a coarse adjustment may be had by removing and inserting pin 113 in a desired one of apertures 111. It will be understood that during the adjustment hereinabove described that plate 101 will slide on the top surfaces of rail member 23 and guide bracket 91. Right shackle means 69 provides means for angling rearward disc assembly 17 and disc gang 51 thereof at a desired angle relative to frame 13. By manipulation of the adjustment means a desired pitch angle or angle of attack may be obtained for the disc gang as it works the land surface.

The thrust spring means for rearward disc assembly 17 is indicated by numeral 125 and is arranged over the medial section of disc assembly crossbar 57 (see FIGS. 1 and 5). Thrust spring means 125 principally includes a base member 127, a tension bolt 129, an anchor tab 131, a stop 133, and a compression spring 135. Angle iron base member 127 is transversely clamped on the top surface of crossbar 57 by threaded fasteners 137 and bridge plate 139. Threaded fasteners 137 arranged on opposite sides of crossbar 57 tightly clamp base member 127 to the crossbar at a desired location. Tension bolt 129 extends through aperture 141 in base member 127 and loosely receives coiled compression spring 135. Nut means 143 on the distal end of tension bolt 129 compressively tensions spring 135 against base member 127. Anchor tab 131 extends horizontally and is fixedly secured adjacent the rear end of left frame rail 21. Clevis portion 145 of tension bolt 129 straddles anchor tab 131 and a vertical pin 147 articulatingly couples the tension bolt and anchor tab. Stop collar 133 is fixed on tension bolt 129 and is adapted to abuttingly engage base member 127.

Forward disc assembly 19 is substantially the same configuration as rearward disc assembly 17 and includes correspondingly a disc gang 149 having a plurality of blades 151, a yoke having a crossbar 153, left and right shackle means 155, 157 and thrust spring means 159. Forward disc gang 149 functions in a direction opposite to rearward disc gang 51.

Rearward spring means 125 yieldingly urges rear disc gang 51 toward the left side of frame 13; thrust spring means 159 of forward disc assembly 19 yieldably urges disc gang 149 toward the right of frame 13. Spring means 125 and 159 urge the disc assemblies generally oppositely and urge respectively each assembly in a direction counter to the horizontal working thrust on each disc gang.

The harrow preferably includes transport means including a set of pneumatic-tired wheels 161 arranged at the longitudinal midsection of the harrow. The wheel-mounting means includes a crank 163 journaled transversely subjacently on frame 13 and pivotable about a horizontal axis extending transversely of the frame. Laterally aligned crank arms 165 in paired arrangement are fixed radially on the opposite end portions of crank 163. Coaxially aligned axles 167 projecting oppositely and fixed on the distal end portions respectively of arms 165 journal wheels 161. A hydraulic cylinder 169 is operably fitted between frame 13 and crank 163 and is adapted to be connected with and energized from the hydraulic power system of a tractor. The base and piston rod ends of cylinder 169 are pivotally secured respectively to frame bracket 171 and crank arm 173. Controlled actuation of cylinder 169 from the tractor vehicle is adapted to raise and lower the forward and rearward disc gangs to and from ground engagement.

Now while I have shown and described an exemplary embodiment of the present invention, it will be understood that various modifications and rearrangements of structure may be made without departing from the scope of the invention.

I claim:
1. In a disc harrow including a frame and at least one disc gang including a coaxially arranged series of concavo-convex disc blades rigidly supported in spaced apart arrangement and oriented axially unidirectionally, the means for supportingly securing said disc gang on said frame comprising rigid yoke means journaling said disc gang, means mounted on sad frame firmly constraining said yoke means from said frame and against fore and aft movement while permitting relatively free translational movement within said constraining means laterally of said frame, and spring means biased from said frame yieldably urging said yoke means laterally of said frame in a direction counter to the direction of axial thrust on the working disc gang.

2. The apparatus of claim 1 in which is included selectively adjustable angling means for fixedly positioning the angle of said disc gang yoke means relative to said frame.

3. A disc harrow adapted for tandem attachment to a tractor comprising a frame including forward laterally spaced apart left and right frame elements and including rearward laterally spaced apart left and right frame elements; a tongue secured on the forward end of said frame adapted for attachment to the hitch of a tractor; a forward disc assembly including a first disc gang, a first stationary yoke, and bearing means journaling said first disc gang on said first yoke, and said first yoke including a horizontal crossbar having left and right horizontal crossbar portions; a rearward disc assembly including a second disc gang, a second stationary yoke, and bearing means journaling said second disc gang on said second yoke, said second yoke including a horizontal crossbar having left and right horizontal crossbar portions; and means movably securing said forward and rearward disc assemblies respectively subjacently on the forward and rearward elements of said frame including forward left and right shackle means guidingly constraining respectively said left and right crossbar portions respectively of said forward disc assembly subjacently on the left and right forward frame elements and including rearward left and right shackle means guidingly constraining respectively said left and right crossbar portions of said rearward disc assembly respectively subjacently on the left and right rearward frame elements, said forward and rearward disc assemblies each being guidingly constrained in reciprocal lateral movement relative to said frame and including forward and rearward thrust spring means biased respectively from said frame for yieldably urging respectively said forward and rearward disc assemblies horizontally and generally oppositely and for urging each disc assembly in a horizontal direction generally counter to the horizontal direction of working thrust on each disc assembly, and further with said right shackle means respectively of said forward and rearward left and right shackle means including forward and rearward angling means for selectively adjustably fixing the right crossbar portions respectively of said forward and rearward disc assemblies fore and aft and relative to said frame, said angling means being adapted for selectively adjusting the working angle of attack respectively of the forward end rearward disc gangs of the harrow.

4. A disc harrow adapted for attachment to a tractor having a hydraulic power system, said disc harrow comprising a frame including left, right, forward and rearward longitudinally extending horizontal frame elements with each frame element having a bottom and a side surface, tongue means secured on the forward end of said frame adapted for attachment to a tractor; a forward disc assembly including a first disc gang, a first stationary yoke, and bearing means journaling said first disc gang on said first yoke, said first yoke including a crossbar having left and right horizontal crossbar portions each having top, bottom and opposite side surfaces; a rearward disc assembly including a second disc gang, a second stationary yoke, and bearing means journaling said second disc gang on said second yoke, said second yoke including a crossbar having left and right horizontal crossbar portions each having top, bottom and opposite side surfaces; and means movably securing said forward and rearward disc assemblies respectively subjacently on the forward and rearward elements of said frame including forward left and right shackle means guidingly constraining respectively said left and right crossbar portions respectively of said forward disc assembly subjacently on the left and right forward frame elements and including rearward left and right shackle means guidingly constraining respectively said left and right crossbar portions of said rearward disc assembly subjacently on the left and right rearward frame elements, said forward and rearward disc assemblies each being guidingly constained in reciprocal movement laterally relative to said frame and with each frame element engaging respectively a respective crossbar portion, and including forward and rearward thrust spring means biased respectively from said frame for yieldably urging respectively said forward and rearward disc assemblies horizontally and generally oppositely and for urging each disc assembly in a direction generally counter to the horizontal direction of working thrust on each disc assembly.

5. The apparatus of claim 4 in which said right shackle means respectively of said forward and rearward left and right shackle means includes forward and rearward means for selectively adjustably fixing the right crossbar portions respectively of said forward and rearward disc assemblies fore and aft relative to said frame, said angling means being adapted for selectively adjusting the working angle of attach respectively of the forward and rearward disc gangs of the harrow.

6. A harrow as defined in claim 4 wherein said forward left shackle means includes a pair of oblong members arranged parallel vertical and fixedly secured on said side surface of said forward left frame element and defining a pair of parallel vertical passages and includes a U-bolt means transversely straddling said crossbar of said forward disc assembly and having shank portions extending respectively through said pair of passages, and includes nut means fixed on the U-bolt means, said U-bolt means and nut means engaging respectively the bottom surface of said left crossbar portion of said forward disc assembly and the top surface of said left forward frame element, and with said U-bolt means and said nut means loosely clamping vertically said crossbar portion of said frame element; and wherein said rearward left shackle means includes a pair of oblong members arranged parallel vertical and fixedly secured on said side surface of said rearward left frame element and defining a pair of parallel vertical passages, and includes U-bolt means having shank portions extending respectively through said pair of passages and includes nut means fixed on U-bolt means, said U-bolt means and said nut means engaging respectively said bottom surface of said left crossbar portion of said rearward disc assembly and the top surface of said left rearward frame element and with said U-bolt means and said nut means loosely clamping vertically said crossbar portion and said frame element.

7. A harrow as defined in claim 4 wherein said forward right shackle means includes guide rail means fixedly secured on the side surface of said rearward forward right frame element and defines a longitudinally extending vertical through slot extending along said side surface of said forward right frame element and includes U-bolt means transversely straddling said crossbar of said forward disc gang and having shank portions extending upwardly through said slot, nut means, and plate means having a pair of apertures, and with the shank portions of said U-bolt extending respectively through said apertures of said plate means and secured by said nut means, said U-bolt means and plate means engaging respectively said bottom surface of said right crossbar portion of said forward disc assembly and the top surface of said right forward frame element, and with said U-bolt means and said plate means loosely clamping vertically said crossbar portion and said frame element, and further with said shackle means including horizontal adjustment means biased from said frame and connected to said plate means for selectively adjustably fixing said right crossbar portion of said forward disc assembly at a certain position relative to said frame; and wherein said rearward right shackle means includes guide rail means fixedly secured on the side surface of said rearward right frame element and defines a longitudinally extending vertical through slot extending along said side surface of said rearward right frame element and includes U-bolt means transversely straddling said crossbar of said rearward disc gang and having shank portions extending upwardly through said slot, nut means, and plate means having a pair of apertures, and with the shank portions of said U-bolt extending respectively through said apertures of said plate means and secured by said nut means, said U-bolt means and said plate means engaging respectively said bottom surface of said right crossbar portion of said rearward disc assembly and the top surface of said right rearward frame element, and with said U-bolt means and said plate means loosely clamping vertically said crossbar portion of said frame element, and further with said shackle means including horizontal adjustment means biased from said frame and connected to said plate means for selectively adjustably fixing the right crossbar portion of said rearward disc assembly at a certain position relative to said frame.

8. A harrow as defined in claim 4 wherein said forward thrust spring means includes a base member fixed on and projecting upwardly from the top surface of said crossbar of said forward disc assembly, and having a hole oriented in a direction parallel to the crossbar, a tension bolt having a proximal end and a distal end and extending through said hole of said base, and with said proximal end being oriented in a direction counter to the direction of working thrust on the forward disc gang, anchor means anchoring the proximal end of said tension bolt to said frame, a stop axially adjustably fixed on said tension bolt, and arranged between said base and said proximal end of said bolt, nut means axially adjustably fixed on the distal end of said tension bolt, and a coiled compression spring convolutely loosely fitted on said tension bolt and compressively tensioned between said base and said nut means.

9. A harrow as defined in claim 4 which additionally includes at least two pneumatic tired wheels, wheel mounting means journaling said wheels coaxially and spaced apart and with the axis of said wheels being transversely of and arranged medially relative to the longitudinal extension of said harrow frame, and further with said wheel mounting means including crank means movably supporting the axles of said wheels from said frame for movement of said wheels vertically reciprocally relative to said frame, and hydraulic cylinder means operably interposedly fitted between frame and said crank means and adapted to be connected with and energized from the hydraulic power system of the tractor; actuation of said hydraulic cylinder being adapted to raise and lower the forward and rearward disc gangs to and from ground engagement.

10. A disc harrow adapted for tandem attachment to a tractor comprising generally horizontal frame means: tongue means supported from said frame means including hitch means adapted for detachable attachment with the hitch means of the tractor; a disc assembly including a disc gang including a series of concavo-convex disc blades rigidly supported in spaced apart arrangement unidirectionally coaxially, yoke means having a horizontal crossbar portion and a plurality of strut bar portions supported on and projecting downwardly from said crossbar portion, bearing means journaling said disc gang on the lower distal end portions respectively of said strut bar portion of said yoke means; shackle means shackling said crossbar portion of said yoke means on said frame means with said disc gang axial extension extending transversely of said frame means, said shackle means including first means supported from said frame means steadfastly restraining said yoke means against fore and aft movement relative to said frame means and including second means supported from said frame means, simultaneously operative with said first means, guidingly constraining said yoke means in bidirectional translational movement generally transversely of said frame means, and including spring means yieldably unidirectionally urging said disc assembly yoke means transversely of said frame means and urging the disc gang axially and in a direction counter to the working draft thrust on the disc gang.

11. A disc harrow adapted for tandem attachment to a tractor comprising generally horizontal frame means having forward and rearward frame portions; tongue means supported on the forward portion of said frame means including hitch means adapted for detachable attachment with the hitch means of the tractor; a forward disc assembly including a disc gang and integrally rigid yoke means journaling said disc gang; a rearward disc assembly including a disc gang and integrally rigid yoke means journaling said disc gang; and means operatively supportingly securing said forward and rearward disc assemblies each transversely of said frame means and respectively in tandem arrangement forwardly and rearwardly of said frame means including forward shackle means supported from said frame means constraining the yoke means of said forward disc assembly against movement longitudinally of said frame means while permitting shifting movement laterally of said frame means, and including rearward shackle means supported from said frame means constraining the yoke means of said rearward disc assembly against movement longitudinally of said frame means while permitting shifting movement laterally of said frame means; and forward and rearward spring means yieldably urging respectively said yoke means of said forward and rearward disc assemblies independently generally transversely of said frame means and urging the disc gang of each disc assembly in a direction counter to the thrust of each working disc gang.

References Cited

UNITED STATES PATENTS

| | | | |
|---|---|---|---|
| 1,026,760 | 5/1912 | Michael | 172—570 |
| 2,970,657 | 2/1961 | Toland | 172—570 X |
| 3,098,530 | 7/1963 | Kenney et al. | 172—591 |

ROBERT E. PULFREY, Primary Examiner

STEPHEN C. PELLEGRINO, Assistant Examiner

U.S. Cl. X.R.

172—455, 591